United States Patent
Magoteaux et al.

(10) Patent No.: US 6,435,543 B1
(45) Date of Patent: Aug. 20, 2002

(54) INFLATABLE SIDE CURTAIN

(75) Inventors: David G. Magoteaux, Mesa; John P. O'Loughlin, Gilbert; Kenneth D. Brannon, Mesa, all of AZ (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 09/535,413

(22) Filed: Mar. 24, 2000

Related U.S. Application Data

(60) Provisional application No. 60/172,778, filed on Dec. 20, 1999.

(51) Int. Cl.[7] ............................................. B60R 21/22
(52) U.S. Cl. .............................. 280/730.2; 280/743.1; 280/749
(58) Field of Search ........................ 280/730.2, 743.1, 280/749

(56) References Cited

U.S. PATENT DOCUMENTS

| | | | | |
|---|---|---|---|---|
| 3,731,949 A | * | 5/1973 | Radke | 280/150 AB |
| 4,029,087 A | * | 6/1977 | Dye et al. | 128/24 R |
| 4,267,611 A | * | 5/1981 | Agulnick | 5/453 |
| 4,391,009 A | * | 7/1983 | Schild et al. | 5/453 |
| 4,766,629 A | * | 8/1988 | Schueler | 5/451 |
| 5,439,247 A | | 8/1995 | Kolb | |
| 5,566,977 A | | 10/1996 | Wipasuramonton | |
| 5,788,270 A | | 8/1998 | Haland et al. | |
| 5,865,462 A | | 2/1999 | Robins et al. | |
| 5,884,937 A | | 3/1999 | Yamada | |
| 5,899,491 A | | 5/1999 | Tschaeschke | |
| 6,042,141 A | * | 3/2000 | Welch et al. | 280/729 |
| 6,073,961 A | * | 6/2000 | Bailey et al. | 280/730.2 |
| 6,082,761 A | * | 7/2000 | Kato et al. | 280/730.2 |
| 6,135,490 A | * | 10/2000 | Spary | 280/730.2 |
| 6,135,493 A | * | 10/2000 | Jost et al. | 280/730.2 |
| 6,152,481 A | * | 11/2000 | Webber et al. | 280/730.2 |
| 6,155,596 A | * | 12/2000 | Nakajima et al. | 280/730.2 |
| 6,168,191 B1 | * | 1/2001 | Webber et al. | 280/730.2 |
| 6,170,860 B1 | * | 1/2001 | Denz et al. | 280/730.2 |
| 6,176,514 B1 | * | 1/2001 | Einsiedel | 280/730.2 |
| 6,199,898 B1 | * | 3/2001 | Masuda et al. | 280/730.2 |
| 6,224,091 B1 | * | 5/2001 | Eyrainer et al. | 280/730.2 |
| 6,231,073 B1 | * | 5/2001 | White, Jr. | 280/730.2 |
| 6,234,516 B1 | * | 5/2001 | Boxey | 280/730.2 |
| 6,237,937 B1 | * | 5/2001 | Kokeguchi et al. | 280/730.2 |
| 6,237,939 B1 | * | 5/2001 | Resh | 280/730.2 |
| 6,296,272 B1 | * | 10/2001 | Heigl | 280/730.2 |

FOREIGN PATENT DOCUMENTS

| | | | |
|---|---|---|---|
| DE | 4134995 | 3/1993 | |
| DE | 4307175 | 3/1993 | |
| DE | 4231522 A1 | * 3/1994 | B60R/21/24 |
| WO | 9919171 | 4/1999 | |

* cited by examiner

*Primary Examiner*—Eric Culbreth
*Assistant Examiner*—Paul Royal, Jr.
(74) *Attorney, Agent, or Firm*—Tarolli, Sundheim, Covell, Tummino & Szabo L.L.P.

(57) ABSTRACT

Apparatus (10) for helping to protect an occupant of a vehicle (12) which has a side structure (16) and a roof (18) comprises an inflatable vehicle occupant protection device (14). The device (14) is inflatable into a position between the side structure (16) and a vehicle occupant. An inflation fluid source (24) provides inflation fluid for inflating the inflatable vehicle occupant protection device (14). The device (14), when inflated, has a perimeter (48) at least partially defined by upper and lower edges (50 and 52) if the device. The device (14) includes overlying panels (40 and 42) interconnected to form a perimeter connection (46) extending along said perimeter (48) and defining an inflatable volume (60), and points of connection (82) defining inflatable chambers (400) of the device. The points of connection (82) include at least one of round connections (84) and line connections (90). The points of connection (82) are arranged such that a line extending vertically from the upper edge (50) to the lower edge (52) at any position along the upper and lower edges intersects at least two of the chambers (400).

26 Claims, 13 Drawing Sheets

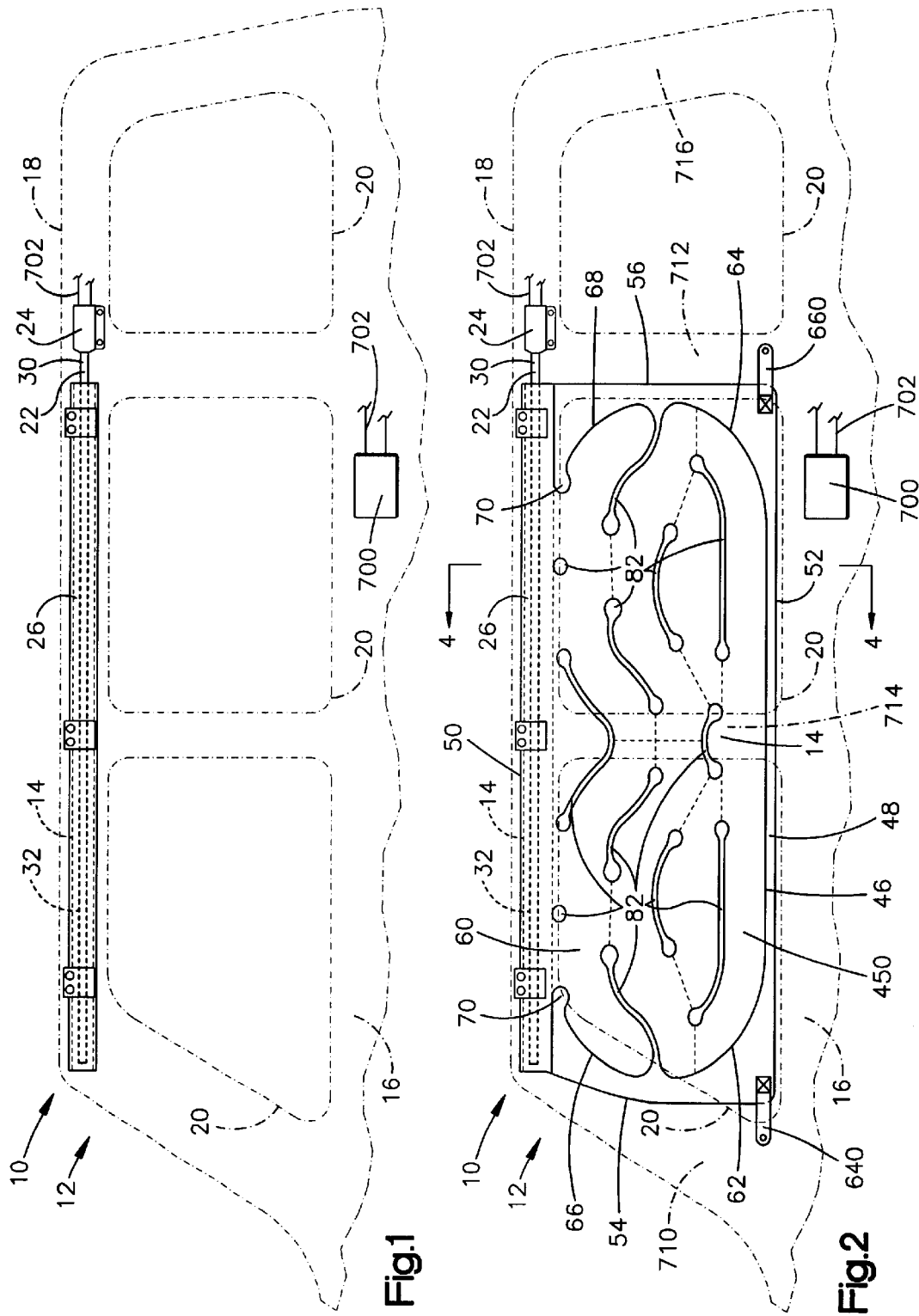

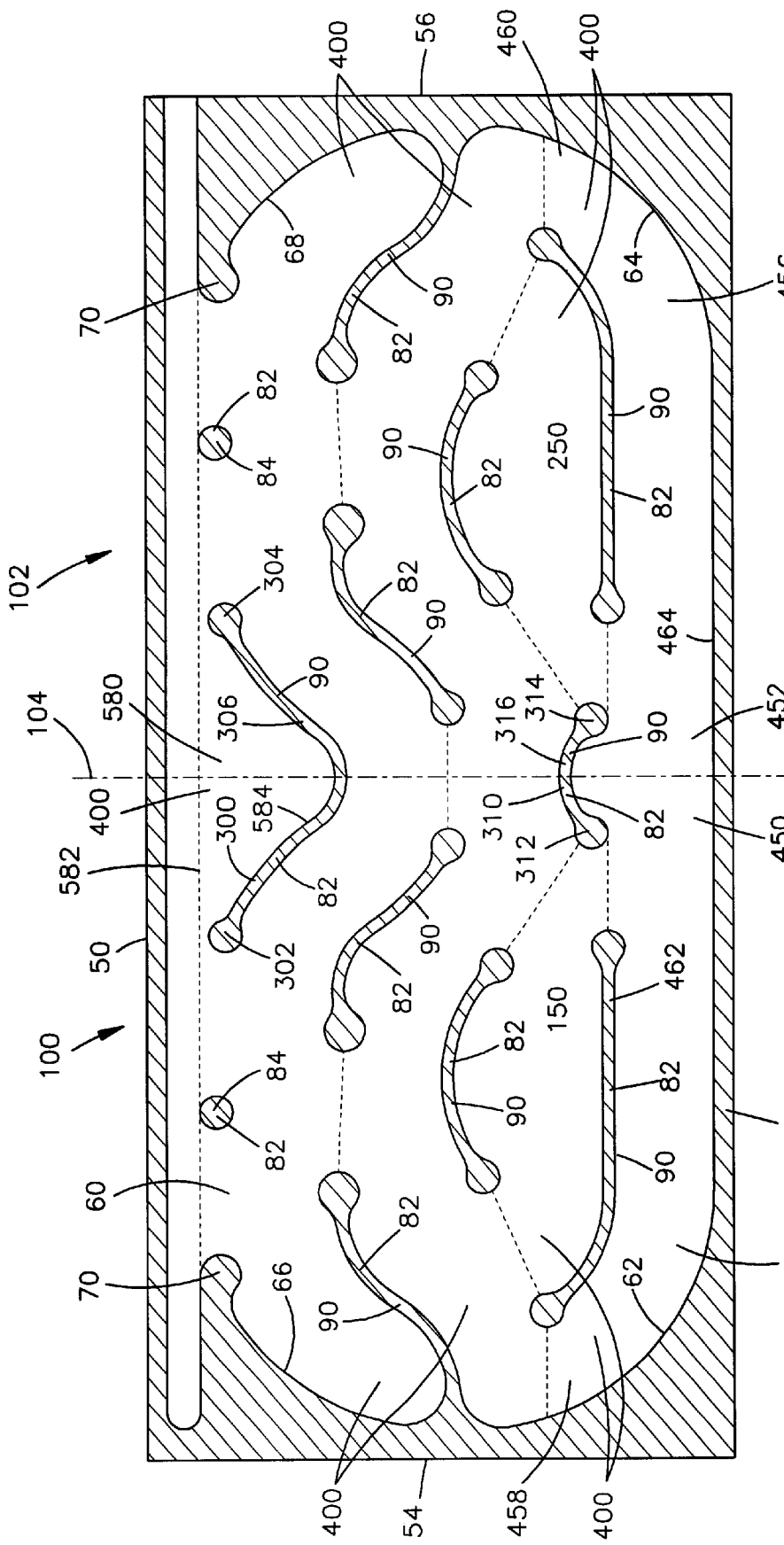

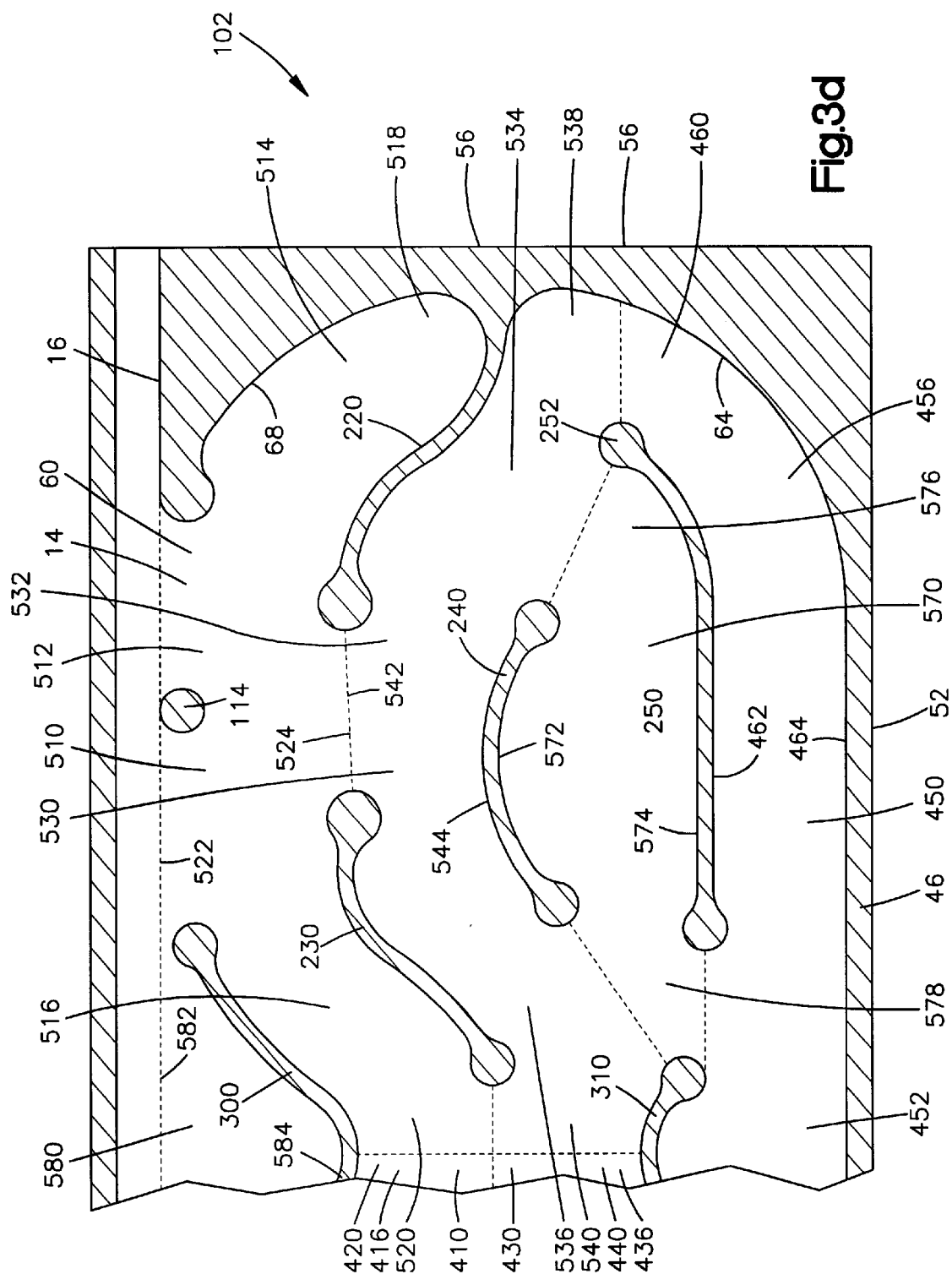

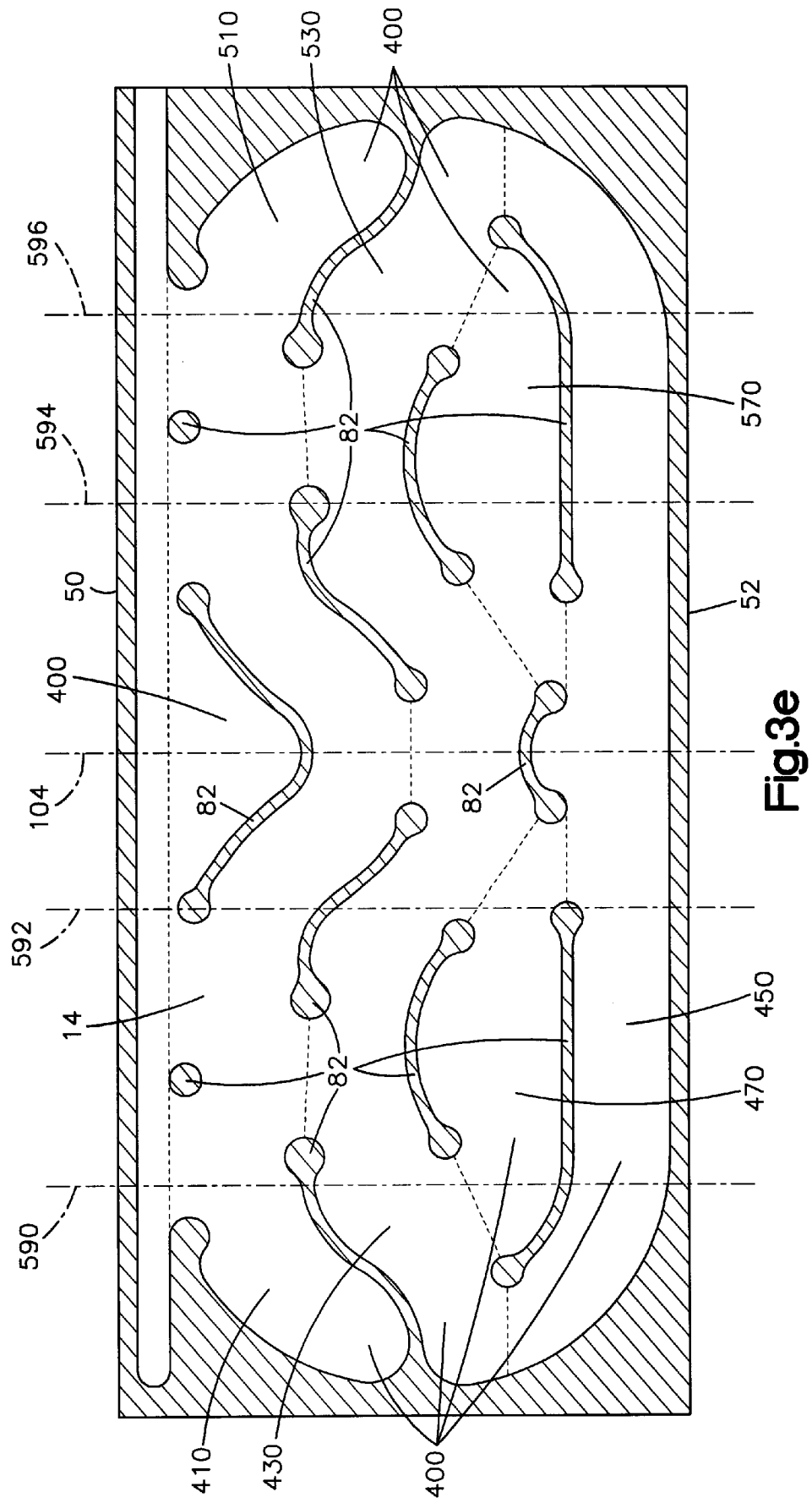

INFLATABLE SIDE CURTAIN

CROSS-REFERENCE TO RELATED APPLICATION

This application claims the benefit of U.S. Provisional Application Ser. No. 60/172778, filed on Dec. 20, 1999.

FIELD OF THE INVENTION

The present invention relates to an apparatus for helping to protect an occupant of a vehicle in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The inflatable vehicle occupant protection device, when inflated, has a perimeter at least partially defined by upper and lower edges of the inflatable vehicle occupant protection device.

The inflatable vehicle occupant protection device includes overlying panels interconnected to form a perimeter connection extending along the perimeter and defining an inflatable volume. Points of connection interconnect the overlying panels within the inflatable volume and define inflatable chambers of the inflatable vehicle occupant protection device. The points of connection include at least one of round connections and line connections. The line connections have opposite end portions, at least one of which is drop-shaped, and a central portion that extends between the end portions. The central portion includes at least a portion that is curved. The points of connection are arranged such that a line extending vertically from the upper edge to the lower edge at any position along the upper and lower edges intersects at least two of the chambers.

The present invention also relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The apparatus also includes a fill tube having a portion located in the inflatable vehicle occupant protection device. The inflation fluid source is in fluid communication with the fill tube and provides inflation fluid to the fill tube when the inflation fluid source is actuated. The fill tube directs the inflation fluid into the inflatable vehicle occupant protection device to inflate the inflatable vehicle occupant protection device.

The inflatable vehicle occupant protection device also includes a pocket for receiving an end portion of the fill tube. The pocket surrounds the end portion of the fill tube and forms a snug fit with the end portion of the fill tube. The pocket helps to position the fill tube relative to the inflatable vehicle occupant protection device.

The present invention also relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The inflatable vehicle occupant protection device, when inflated, has a perimeter defined by upper and lower edges of the inflatable vehicle occupant protection device and front and rear edges of the inflatable vehicle occupant protection device that are spaced apart horizontally along the upper and lower edges.

The inflatable vehicle occupant protection device comprises overlying panels interconnected to form a perimeter connection that extends along the perimeter and defines an inflatable volume. Points of connection interconnect the overlying panels within the inflatable volume to define inflatable chambers of the inflatable vehicle occupant protection device. The inflatable chambers include at least one generally arc-shaped chamber that, when inflated, is positioned adjacent to a body part of the vehicle occupant. The body part moves along an arc-shaped path when the vehicle occupant moves from a reclined position to a leaned forward position. The arc-shaped chamber extends such that the arc-shaped chamber is positioned adjacent to the body part when the vehicle occupant moves from the reclined position to the leaned forward position.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view illustrating an apparatus for helping to protect a vehicle occupant in a deflated condition, according to a first embodiment of the present invention;

FIG. 2 is a schematic view of the apparatus of FIG. 1 in an inflated condition;

FIGS. 3 is a plan view of a part of the apparatus of FIG. 2;

FIGS. 3a–3d are enlarged views of portions of the apparatus of FIG. 3;

FIGS. 3e and 3f are plan views of a part of the apparatus of FIG. 2;

DESCRIPTION OF PREFERRED EMBODIMENTS

Figure 2A:
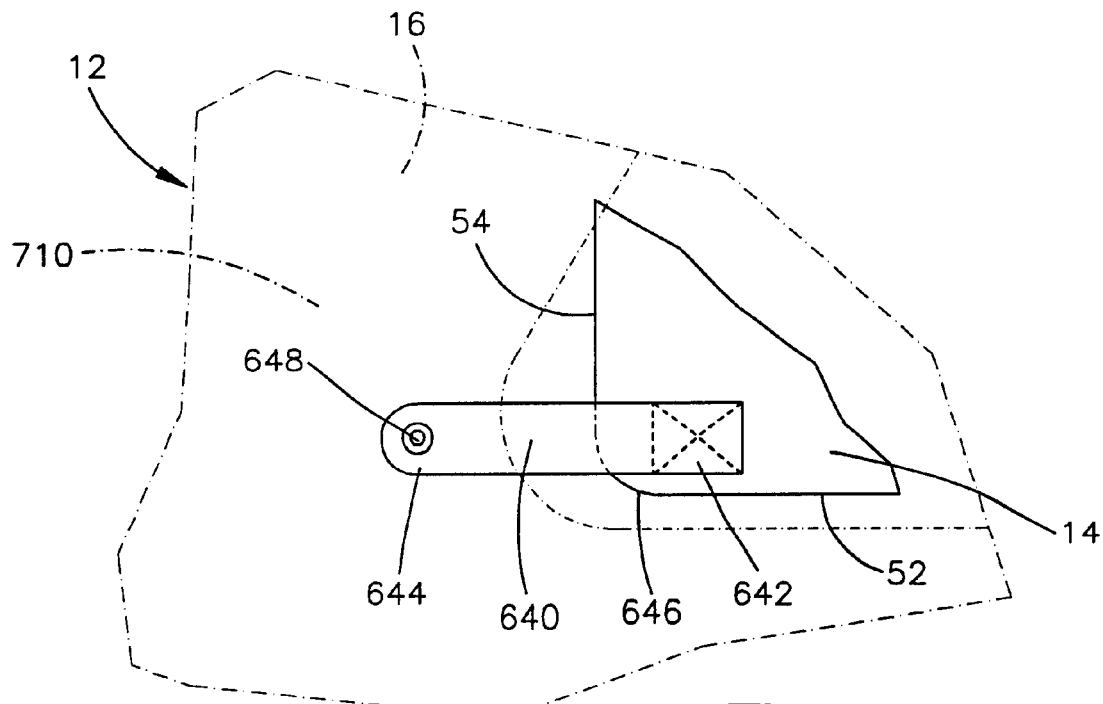
FIGS. 2a and 2b are enlarged schematic views of portions of the apparatus of FIG. 2.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 22 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

Figure 4:
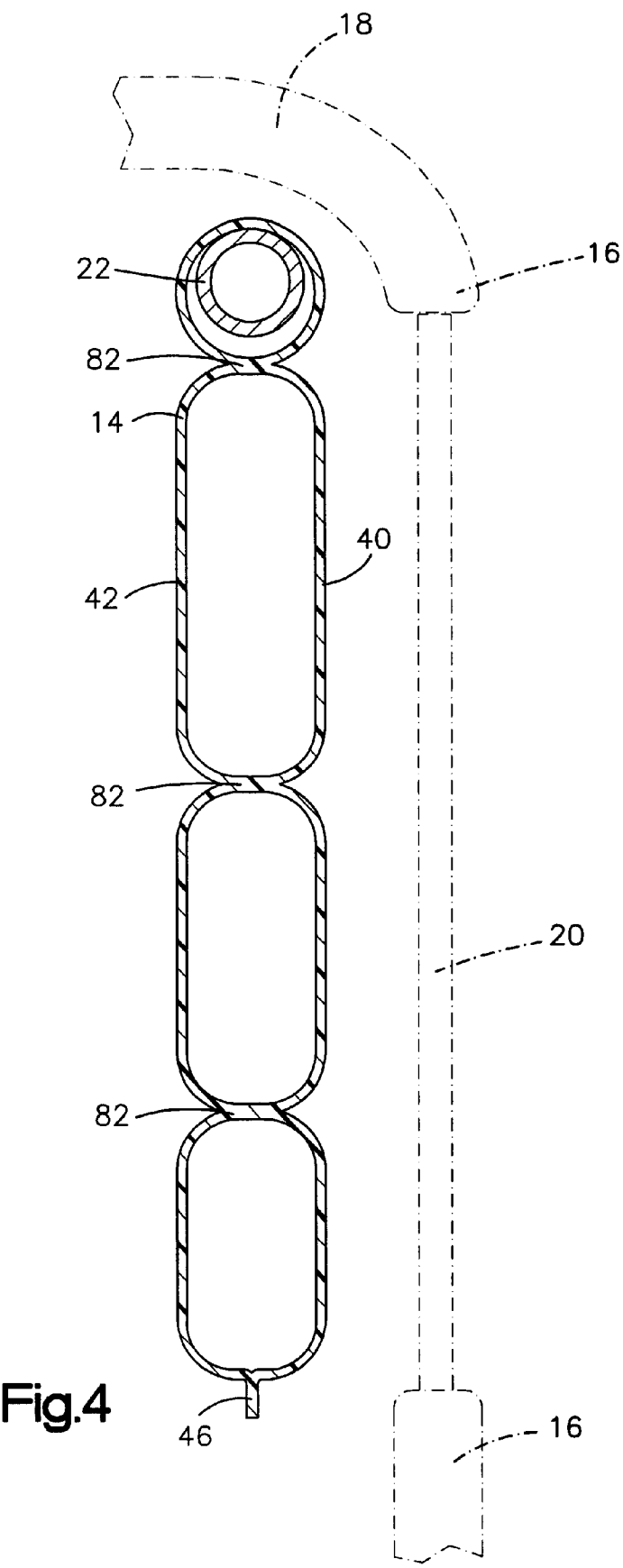
FIG. 4 is a sectional view of the apparatus of FIG. 2 taken generally along line 4—4 in FIG. 2.

As best illustrated in FIG. 4, the inflatable curtain 14 comprises first and second panels 40 and 42 that are arranged in an overlying manner. The first and second panels 40 and 42 are interconnected to form a perimeter connection 46 (FIGS. 2 and 4) that extends along a perimeter 48 of the panels. The perimeter 48 (FIG. 2) of the inflatable curtain 14 is defined by upper and lower edges 50 and 52, respectively, of the curtain and front and rear edges 54 and 56, respectively, of the curtain that are spaced apart horizontally along the upper and lower edges. The upper and lower edges 50 and 52 of the inflatable curtain 14 could, however, be curved and extended until they intersect.

In the illustrated embodiment, the inflatable curtain 14 (FIG. 4) may be formed by sewing or RF welding two fabric pieces together, or a single piece of fabric that is folded over to form the overlying first and second panels 40 and 42. An alternative method of construction consists of weaving both the first and second panels 40 and 42 simultaneously while also interweaving the perimeter connection 46 and points of connection 82 as a single layer of fabric. This can be accomplished by using a Jacquard or Dobby weaving machine. The weaving machines are pre-programmed to weave the first and second panels 40 and 42 along with the perimeter connection 46 and points of connection 82 at the same time. No intermediate steps are required.

The first and second panels 40 and 42 are constructed of a material, such as nylon and/or polyester. Other materials, such as elastomers, plastic films, or combinations thereof, may also be used to construct the inflatable curtain 14. The first and second panels 40 and 42 may also be formed of single or multi-layered sheets of material.

The perimeter connection 46 (FIG. 2) defines an inflatable volume 60 of the inflatable curtain 14. The perimeter connection 46 extends a variable distance from the edges of the inflatable curtain 14, defining a curved shape for the inflatable volume 60. A portion of the perimeter connection 46 adjacent the front edge 54 and the lower edge 52 of the inflatable curtain 14 defines a curved front-lower corner 62 of the inflatable volume 60. A portion of the perimeter connection 46 adjacent the rear edge 56 and the lower edge 52 defines a curved rear-lower corner 64 of the inflatable volume 60. A portion of the perimeter connection 46 adjacent the front edge 54 and spaced from the upper edge 50 of the inflatable curtain 14 defines a curved front-upper corner 66 of the inflatable volume 60. A portion of the perimeter connection 46 adjacent the rear edge 56 and spaced from the upper edge 50 of the inflatable curtain 14 defines a curved rear-upper corner 68 of the inflatable volume 60. The portions of the perimeter connection 46 that define the front-upper corner 66 and rear-upper corner 68 of the inflatable volume 60 include rounded end portions 70.

The first and second panels 40 and 42 (FIG. 4) are interconnected to form the points of connection 82 within the inflatable volume 60 of the inflatable curtain 14. As illustrated in FIG. 3, the points of connection 82 include the round connections 84 and the line connections 90. Alternative means (not shown), such as stitching, dielectric sealing, ultrasonic bonding, heat sealing, and adhesives, may also be used to interconnect the first and second panels 40 and 42 (FIG. 4) in order to form the points of connection 82.

The first and second panels 40 and 42, the perimeter connection 46, and the points of connection 82 may be coated using a laminate film, slurry, and/or a spray coating, such as silicone, urethane, or other known suitable materials, in order to achieve a substantially air-tight construction. This helps to prevent gas from permeating directly through the first and second panels 40 and 42, the perimeter connection 46, and the points of connection 82.

The inflatable curtain 14 (FIG. 3) includes a front portion 100 and a rear portion 102. The first portion 100 is located forward in the vehicle 12 and the rear portion 102 is located rearward in the vehicle. The boundary between the front portion 100 and the rear portion 102 is indicated by the dashed line labeled 104 in FIG. 3. In the illustrated embodiment, the front portion 100 and the rear portion 102 are symmetrical or mirror images of each other. Line connections 90 located in the front portion 100 have similar, corresponding line connections 90 in the rear portion 102. Also, line connections 90 that are positioned in both the front portion 100 and the rear portion 102 are symmetrical or have portions that are mirror images of each other. It will be recognized by those skilled in the art that the dimensions of the front and rear portions 100 and 102 may be adjusted so as to provide the required coverage of the vehicle side structure 16 for vehicles having different dimensions. In this instance, the line connections 90 and round connections 84 may not be symmetrical or mirror images of each other.

Figure 3A:
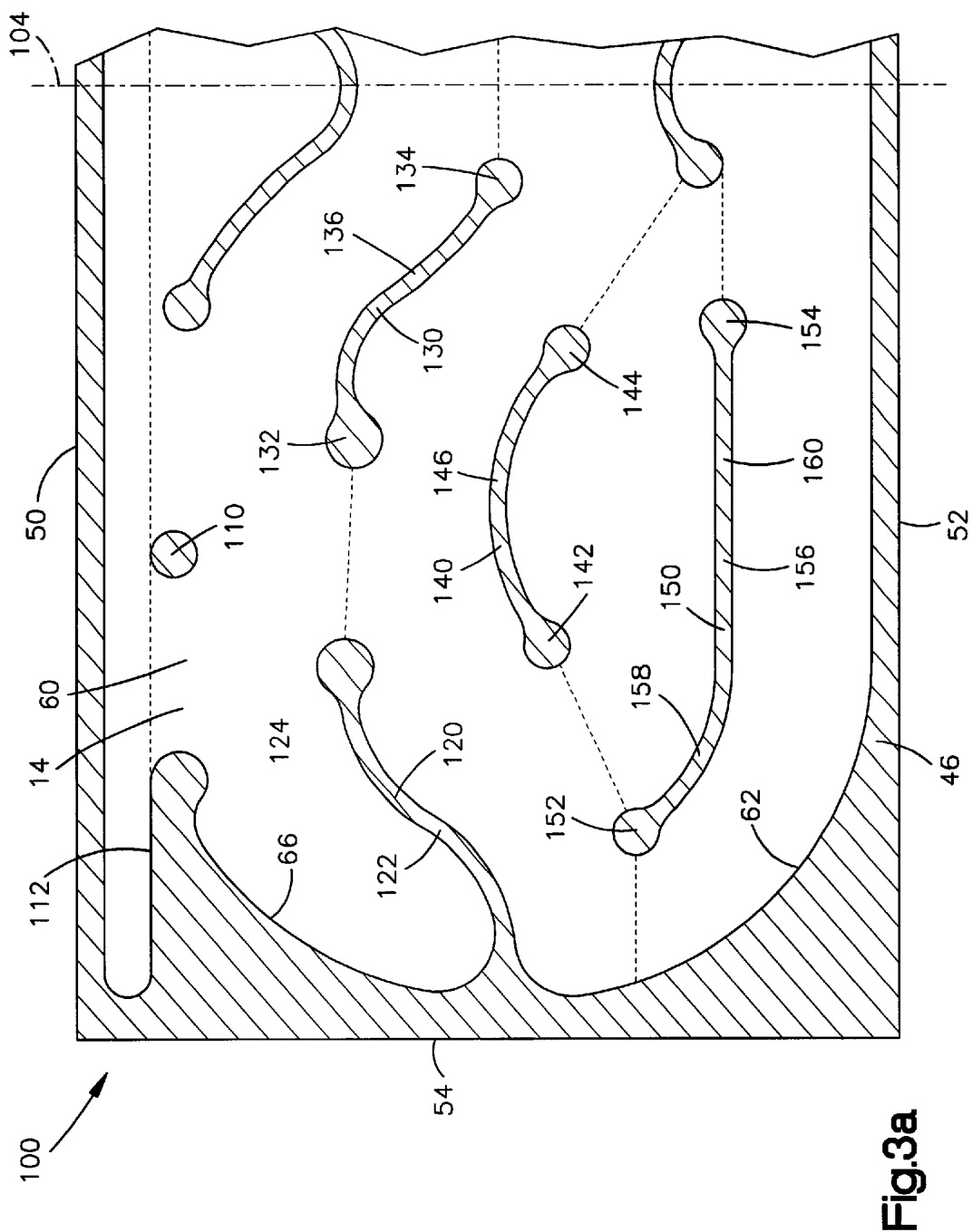

As illustrated in FIG. 3a, a first round connection 110 is spaced away from the upper edge 50 of the inflatable curtain 14 in the front portion 100 of the inflatable curtain 14. The first round connection 110 is positioned, preferably, such that the point on the first round connection 110 nearest the upper edge 50 of the inflatable curtain 14 is aligned with an edge 112 of the portion of the perimeter connection 46 that defines the curved front-upper corner 66 of the inflatable volume 60.

Figure 3B:
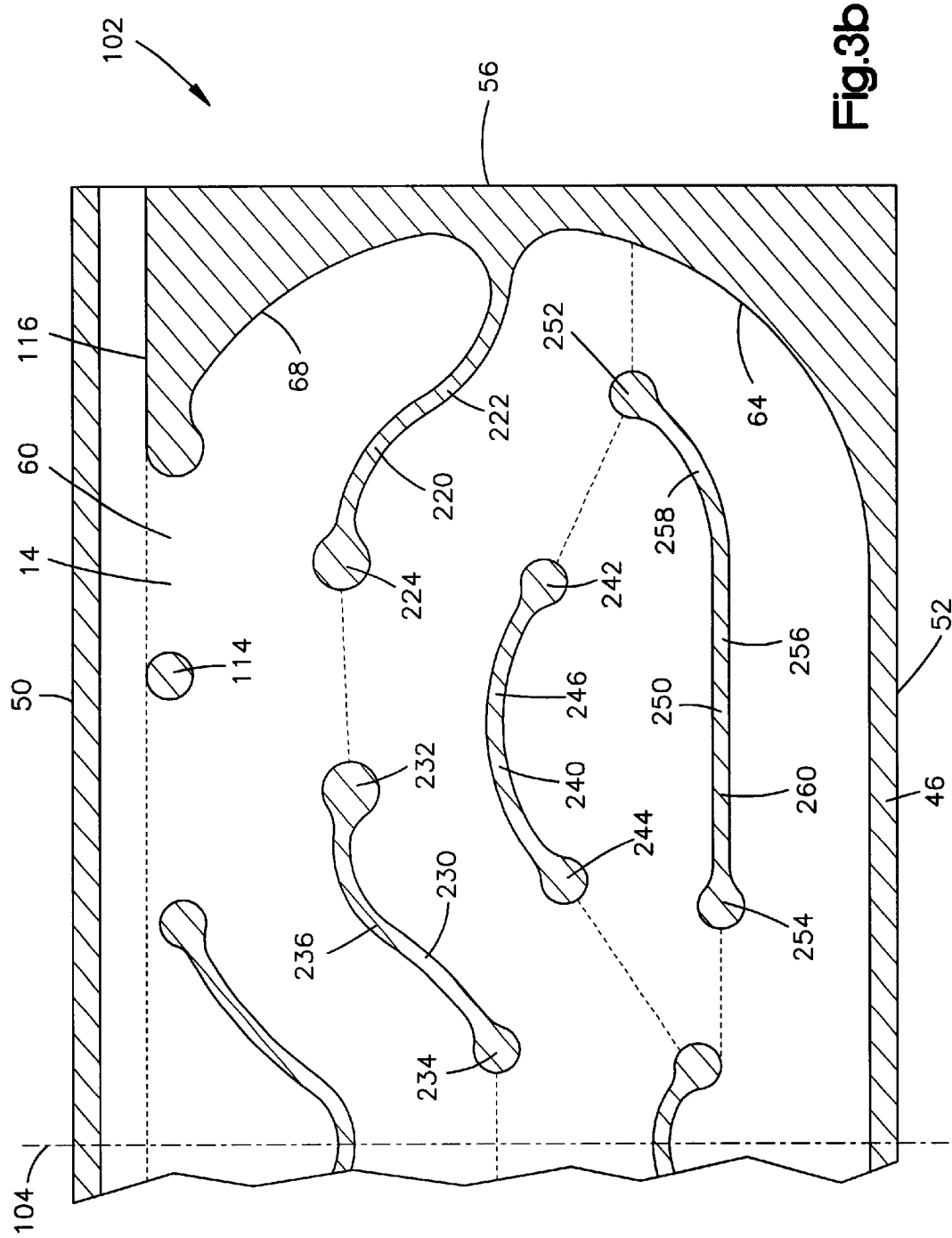

As illustrated in FIG. 3b, a second round connection 114 is spaced away from the upper edge 50 of the inflatable curtain 14 in the rear portion 102 of the inflatable curtain 14. The second round connection 114 is positioned, preferably, such that the point on the second round connection 114 nearest the upper edge 50 of the inflatable curtain 14 is aligned with an edge 116 of the portion of the perimeter connection 46 that defines the curved rear-upper corner 68 of the inflatable volume 60. The edge 116 is preferably aligned with the edge 112 (FIG. 3a).

A first line connection 120 (FIG. 3a) extends from the perimeter connection 46 at a position adjacent the front edge 54 of the inflatable curtain 14. The first line connection 120 may extend from the perimeter connection 46 at or near the midpoint of the front edge 54. A central portion 122 of the first line connection 120 curves generally diagonally upward and away from the front edge 54 of the inflatable curtain 14. The first line connection 120 includes a drop-shaped end portion 124 spaced away from the front edge 54 of the inflatable curtain 14.

A second line connection 130 has a drop-shaped first end portion 132 generally horizontally aligned with the end portion 124 of the first line connection 120, and an opposite drop-shaped second end portion 134. A central portion 136 of the second line connection 130 curves generally diagonally downward and away from the front edge 54 of the inflatable curtain 14, from the first end portion 132 to the second end portion 134.

A third line connection 140 has a drop-shaped first end portion 142 and an opposite drop-shaped second end portion 144. A central portion 146 of the third line connection 140 extends along a curve between the first end portion 142 and the second end portion 144. The third line connection 140 is spaced vertically below the end portion 124 of the first line connection 120 and vertically below the second line connection 130. The first end portion 142 and the second end portion 144 of the third line connection 140 may be generally horizontally aligned.

A fourth line connection 150 has a drop-shaped first end portion 152 and an opposite drop-shaped second end portion 154. A central portion 156 of the fourth line connection 150 extends between the first end portion 152 and the second end portion 154. The central portion 156 of the fourth line connection 150 includes a curved portion 158 and a straight portion 160. The curved portion 158 extends generally diagonally downward and away from the front edge 54 of the inflatable curtain 14. The curved portion 158 extends generally parallel to the front-lower corner 62 of the inflatable volume 60. The straight portion 160 extends generally horizontally from the curved portion 158 to the second end portion 154. The straight portion 160 extends generally parallel to the lower edge 52 of the inflatable curtain 14. The fourth line connection 150 is spaced vertically below the third line connection 140, vertically below the first line connection 120 and vertically below the second line connection 130.

A fifth line connection 220 (FIG. 3b) extends from the perimeter connection 46 at a position adjacent the rear edge 56 of the inflatable curtain 14. As illustrated in the Figures, the fifth line connection 220 may extend from the perimeter connection 46 at or near the midpoint of the rear edge 56. A central portion 222 of the fifth line connection 220 curves generally diagonally upward and away from the rear edge 56 of the inflatable curtain 14. The fifth line connection 220 includes a drop-shaped end portion 224 spaced away from the rear edge 56 of the inflatable curtain 14.

A sixth line connection 230 has a drop-shaped first end portion 232 generally horizontally aligned with the end portion 224 of the fifth line connection 220, and an opposite drop-shaped second end portion 234. A central portion 236 of the sixth line connection 230 curves generally diagonally downward and away from the rear edge 56 of the inflatable curtain 14, from the first end portion 232 to the second end portion 234.

A seventh line connection 240 has a drop-shaped first end portion 242 and an opposite drop-shaped second end portion 244. A central portion 246 of the seventh line connection 240 extends along a curve between the first end portion 242 and the second end portion 244. The seventh line connection 240 is spaced vertically below the end portion 224 of the fifth line connection 220 and vertically below the sixth line connection 230. The first end portion 242 and the second end portion 244 of the seventh line connection 240 may be generally horizontally aligned.

An eighth line connection 250 has a drop-shaped first end portion 252 and an opposite drop-shaped second end portion 254. A central portion 256 of the eighth line connection 250 extends between the first end portion 252 and the second end portion 254. The central portion 256 of the eighth line connection 250 includes a curved portion 258 and a straight portion 260. The curved portion 258 extends generally diagonally downward and away from the rear edge 56 of the inflatable curtain 14. The curved portion 258 extends generally parallel to the rear-lower corner 64 of the inflatable volume 60. The straight portion 260 extends generally horizontally from the curved portion 258 to the second end portion 254. The straight portion 260 extends generally parallel to the lower edge 52 of the inflatable curtain 14. The eighth line connection 250 is spaced vertically below the seventh line connection 240, vertically below the fifth line connection 220 and vertically below the sixth line connection 230.

A ninth line connection 300 (FIG. 3) has a drop-shaped first end portion 302 and an opposite drop-shaped second end portion 304. The first and second end portions 302 and 304 are spaced away from the upper edge 50 of the inflatable curtain 14 and are horizontally aligned with each other. The first end 302 is located in the front portion 100 of the inflatable curtain 14 and the second end portion 304 is located in the rear portion 102 of the inflatable curtain. The ninth line connection 300 is positioned between the upper edge 50 of the inflatable curtain 14 and the second and sixth line connections 130 and 230, respectively. The ninth line connection 300 is positioned such that the points on the first and second end portions 302 and 304 nearest the upper edge 50 of the inflatable curtain 14 are located below the edges 112 and 116 of the perimeter connection 46. A central portion 306 of the ninth line connection 300 extends along a generally V-shaped or U-shaped curve between the first end portion 302 and the second end portion 304.

A tenth line connection 310 has a drop-shaped first end portion 312 and an opposite drop-shaped second end portion 314. The first and second end portions 312 and 314 are spaced away from the lower edge 52 of the inflatable curtain 14 and are horizontally aligned with each other. The first end portion 312 is located in the front portion 100 of the inflatable curtain 14 and the second end portion 314 is located in the rear portion 102 of the inflatable curtain. The tenth line connection 310 is positioned between the second end portions 154 and 254 of the fourth and eighth line connections 150 and 250, respectively. The first and second end portions 312 and 314 of the tenth line connection 310 may be generally aligned with the second end portions 154 and 254 of the fourth and eighth line connections 150 and 250, respectively. A central portion 316 of the tenth line connection 310 extends along a curve, positioned facing concavely downward, between the first end portion 312 and the second end portion 314.

As illustrated in FIG. 3, the points of connection 82 define a plurality of inflatable chambers 400 in the inflatable volume 60 of the inflatable curtain 14. The inflable chambers 400 are in fluid communication with each other. The boundaries of the inflatable chambers 400 are illustrated partially by the dashed lines in FIG. 3.

Figure 3C:
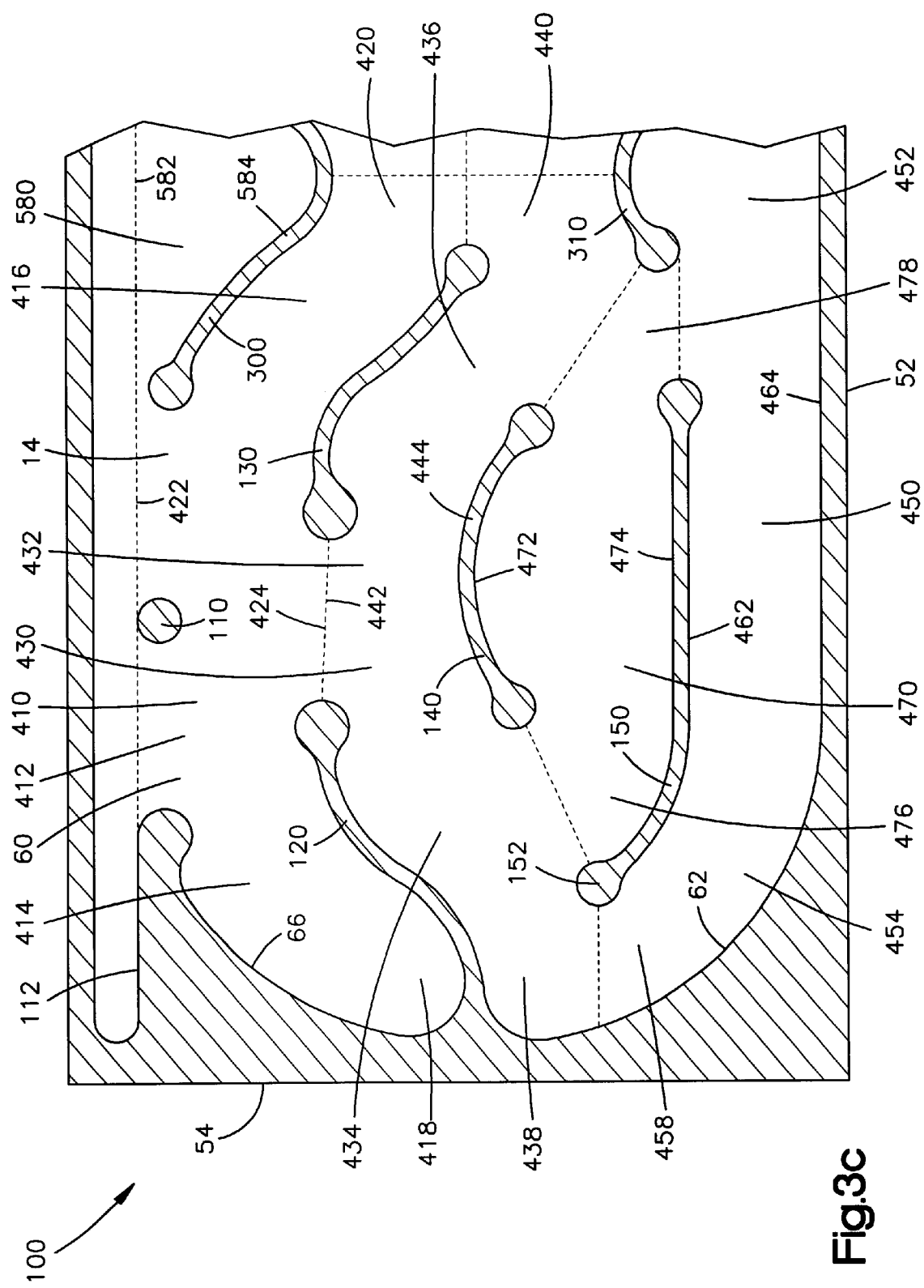

As illustrated in FIG. 3c, an inflatable first arc-shaped chamber 410 is located in the front portion 100 of the inflatable curtain 14 and has a base portion 412 and first and second leg portions 414 and 416, respectively, that curve downwardly and outwardly away from opposite ends of the base portion. The first leg portion 414 of the first arc-shaped chamber 410 has a terminal end 418 adjacent the front edge 54 of the inflatable curtain 14. The second leg portion 416 of the first arc-shaped chamber 410 has a terminal end 420 spaced away from the front edge 54 of the inflatable curtain 14.

The first arc-shaped chamber 410 has an upper side wall 422 that is partially defined by the front-upper corner 66 of the inflatable volume 60, the first round connection 110, a portion of the ninth line connection 300, and the dashed line extending from the edge 112 of the perimeter connection 46. The first arc-shaped chamber 410 has a lower side wall 424 that is partially defined by the first and second line connections 120 and 130, and the dashed line extending between the first and second line connections 120 and 130.

An inflatable second arc-shaped chamber 430 is located in the front portion 100 of the inflatable curtain 14 and has a base portion 432 and first and second leg portions 434 and 436, respectively, that curve downwardly and outwardly away from opposite ends of the base portion. The second arc-shaped chamber 430 is positioned adjacent to the first arc-shaped chamber 410 and below the first arc-shaped chamber. The first leg portion 434 of the second arc-shaped chamber 430 has a terminal end 438 adjacent the front edge 54 of the inflatable curtain 14. The second leg portion 436 of the second arc-shaped chamber 430 has a terminal end 440 spaced away from the front edge 54 of the inflatable curtain 14.

The second arc-shaped chamber 430 has an upper side wall 442 that is partially defined by the lower side wall 424 of the first arc-shaped chamber 410, i.e. the first and second line connections 120 and 130, and the dashed line extending between the first and second line connections 120 and 130. The second arc-shaped chamber 430 has a lower side wall 444 that is partially defined by the first end portion 152 of the fourth line connection 150, the third line connection 140, and a portion of the tenth line connection 310. The lower side wall 444 is further defined by the dashed line extending between the third and fourth line connections 140 and 150, and the dashed line extending between the third and tenth line connections 140 and 310.

An inflatable lower chamber 450 (FIGS. 3, 3c, and 3d) extends adjacent to the lower edge 52 of the inflatable curtain 14 from a position adjacent the front edge 54 of the curtain to a position adjacent the rear edge 56 of the curtain. The lower chamber 450 has a base portion 452 and first and second leg portions 454 and 456, respectively, that curve upwardly and outwardly away from opposite ends of the base portion. The first leg portion 454 of the lower chamber 450 has a first terminal end 458 adjacent the front edge 54 of the inflatable curtain 14. The second leg portion 456 of the lower chamber 450 has a second terminal end 460 adjacent the rear edge 56 of the inflatable curtain 14.

The lower chamber 450 has an upper side wall 462 that is partially defined by the fourth line connection 150, the eighth line connection 250, and the tenth line connection 310. The upper side wall 462 is further defined by the dashed line extending between the fourth and tenth line connections 150 and 310, and the dashed line extending between the eighth and tenth line connections 250 and 310. The lower chamber 450 has a lower side wall 464 that is defined by front-lower corner 62 of the inflatable volume 60, the rear-lower corner 64 of the inflatable volume 60, and the perimeter connection 46 extending along the lower edge 52 of the inflatable curtain 14.

An inflatable first middle chamber 470 (FIG. 3c) is positioned between the second arc-shaped chamber 430 and the lower chamber 450. The first middle chamber 470 has an upper side wall 472 that is defined by a portion of the lower side wall 444 of the second arc-shaped chamber 430. Specifically, the upper side wall 472 of the first middle chamber 470 is defined by the third line connection 140, the dashed line extending between the third and tenth line connections 140 and 310, and the dashed line extending between the third and fourth line connections 140 and 150. The first middle chamber 470 has a lower side wall 474 that is partially defined by a portion of the upper side wall 462 of the lower chamber 450, i.e. the fourth line connection 150, and the dashed line extending between the fourth and tenth line connections 150 and 310. The upper side wall 472 and the lower side wall 474 of the first middle chamber 470 intersect each other at first and second opposite ends 476 and 478, respectively, of the first middle chamber 470.

An inflatable third arc-shaped chamber 510 (FIG. 3d) is located in the rear portion 102 of the inflatable curtain 14 and has a base portion 512 and first and second leg portions 514 and 516, respectively, that curve downwardly and outwardly away from opposite ends of the base portion. The first leg portion 514 of the third arc-shaped chamber 510 has a terminal end 518 adjacent the rear edge 56 of the inflatable curtain 14. The second leg portion 516 of the third arc-shaped chamber 510 has a terminal end 520 spaced away from the rear edge 56 of the inflatable curtain 14, adjacent the terminal end 420 of the second leg portion 416 of the first arc-shaped chamber 410.

The third arc-shaped chamber 510 has an upper side wall 522 that is partially defined by the rear-upper corner 68 of the inflatable volume 60, the second round connection 114, a portion of the ninth line connection 300, and the dashed line that extends from the edge 116 of the perimeter connection 46. The third arc-shaped chamber 510 has a lower side wall 524 that is partially defined by the fifth and sixth line connections 220 and 230, and the dashed line extending between the fifth and sixth line connections 220 and 230.

An inflatable fourth arc-shaped chamber 530 is located in the rear portion 102 of the inflatable curtain 14 and has a base portion 532 and first and second leg portions 534 and 536, respectively, that curve downwardly and outwardly away from opposite ends of the base portion. The fourth arc-shaped chamber 530 is positioned adjacent to the third arc-shaped chamber 510 and below the third arc-shaped chamber. The first leg portion 534 of the fourth arc-shaped chamber 530 has a terminal end 538 adjacent the rear edge 56 of the inflatable curtain 14. The second leg portion 536 of the fourth arc-shaped chamber 530 has a terminal end 540 spaced away from the rear edge 54 of the inflatable curtain 14, adjacent the terminal end 440 of the second leg portion 436 of the second arc-shaped chamber 430.

The fourth arc-shaped chamber 530 has an upper side wall 542 that is partially defined by the lower side wall 524 of the third arc-shaped chamber 510, i.e. the fifth and sixth line connections 220 and 230, and the dashed line extending between the fifth and sixth line connections 220 and 230. The fourth arc-shaped chamber 530 has a lower side wall 544 that is partially defined by the first end portion 252 of the eighth line connection 250, the seventh line connection 240, and a portion of the tenth line connection 310. The lower side wall 544 is further defined by the dashed line extending between the seventh and eighth line connections 240 and 250, and the dashed line extending between the seventh and tenth line connections 240 and 310.

An inflatable second middle chamber 570 is positioned between the fourth arc-shaped chamber 530 and the lower chamber 450. The second middle chamber 570 has an upper side wall 572 that is defined by a portion of the lower side wall 544 of the fourth arc-shaped chamber 530. Specifically, the upper side wall 572 of the second middle chamber 570 is defined by the seventh line connection 230, the dashed line extending between the seventh and eighth line connections 240 and 250, and the dashed line extending between the seventh and tenth line connections 240 and 310. The second middle chamber 570 has a lower side wall 574 that is partially defined by a portion of the upper side wall 462 of the lower chamber 450, i.e. the eighth line connection 250, and the dashed line extending between the eighth and tenth line connections 250 and 310. The upper side wall 572 and the lower side wall 574 of the second middle chamber 570 intersect each other at first and second opposite ends 576 and 578, respectively, of the second middle chamber 570.

A top middle chamber 580 (FIGS. 3, 3c, and 3d) is positioned in the front portion 100 and the rear portion 102 of the inflatable curtain 14. The top middle chamber 580 has an upper side wall 582 defined by the dashed line extending between the edges 112 and 116 of the perimeter connection 46. The top middle chamber 580 has a lower side wall 584 defined by the ninth line connection 300.

As illustrated in FIG. 3e, all of the inflatable chambers 400 extend either generally horizontally or diagonally in the inflatable curtain 14. No single inflatable chamber 400 extends from the upper edge 50 to the lower edge 52 of the inflatable curtain 14. The points of connection 82 are arranged such that a line extending vertically from the upper edge 50 to the lower edge 52 at any position along the upper and lower edges intersects at least two of the inflatable chambers 400. For example, the line labeled 590 extends through the first arc-shaped chamber 410, the second arc-shaped chamber 430, the first middle chamber 470, and the bottom chamber 450. The line labeled 592 extends through the first arc-shaped chamber 410, the second arc-shaped chamber 430, the first middle chamber 470, and the bottom chamber 450. The line labeled 594 extends through the third arc-shaped chamber 510, the fourth arc-shaped chamber 530, the second middle chamber 570, and the bottom chamber 450. The line labeled 596 extends through the third arc-shaped chamber 510, the fourth arc-shaped chamber 530, the second middle chamber 570, and the bottom chamber 450.

Figure 3F:
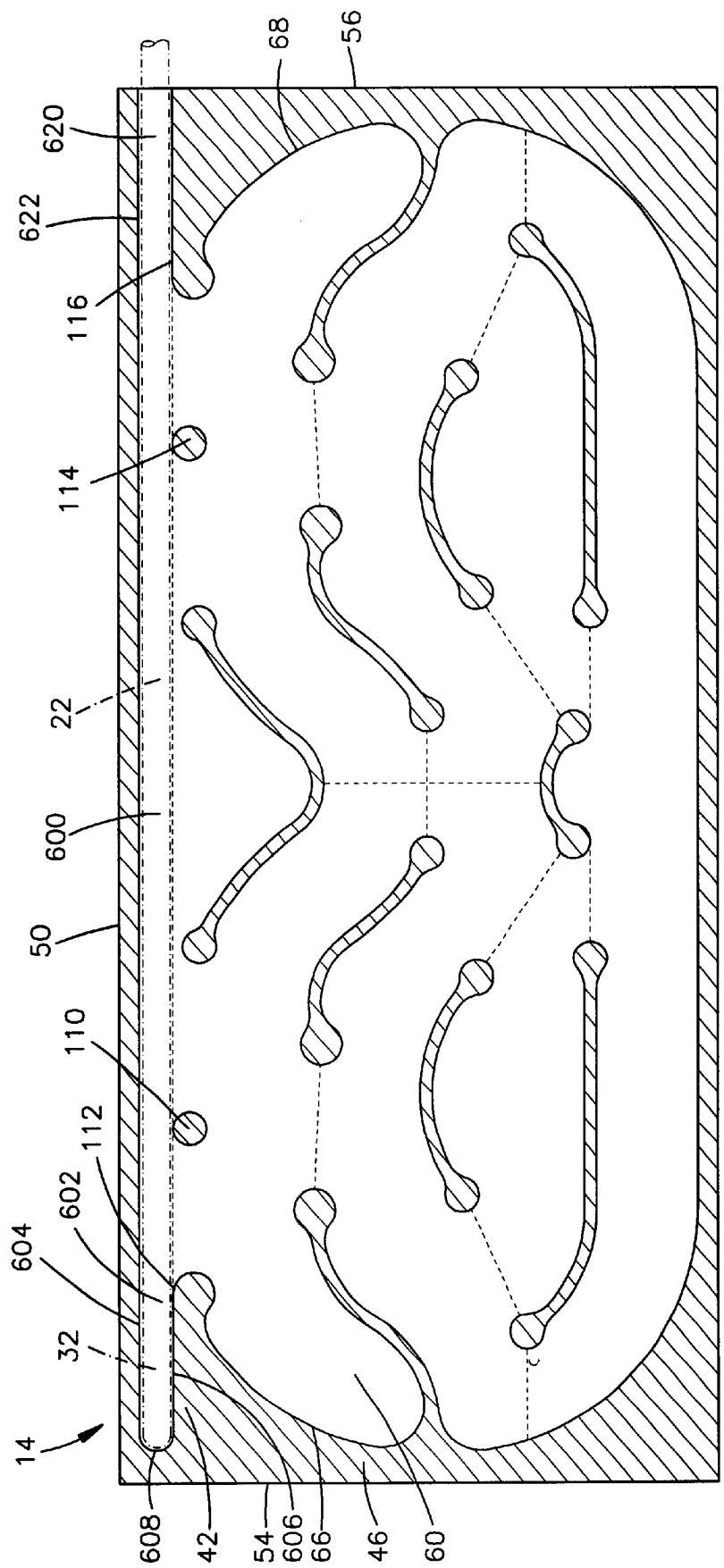

As illustrated in FIG. 3f, the inflatable curtain 14 includes a portion 600 for receiving the fill tube 22 that extends parallel to the upper edge 50 of the curtain. The portion 600 includes a pocket 602, adjacent the intersection of the front edge 54 and the upper edge 50 of the inflatable curtain 14, for receiving the second end portion 32 of the fill tube 22. The pocket 602 surrounds the second end portion 32 of the fill tube 22 and forms a snug fit with the fill tube. The pocket 602 thus helps to position the fill tube 22 relative to the inflatable curtain 14 and helps to maintain the position of the fill tube relative to the curtain.

The pocket 602 is defined by portions of the perimeter connection 46. A first portion 604 of the pocket 602 is defined by a portion of the perimeter connection 46 that extends along the upper edge 50 of the inflatable curtain 14 and intersects the front edge 54 of the curtain. A second portion 606 of the pocket 602 is spaced apart from the first portion 604 and extends parallel to the first portion 604. The second portion 606 is defined by the edge 112 of the portion of the perimeter connection 46 that defines the curved front-upper corner 66 of the inflatable volume 60. An end portion 608 of the pocket 602 is defined by a portion of the perimeter connection 46 extending along the front edge 54 of the inflatable curtain between the first and second portions 604 and 606 of the pocket 602.

The portion 600 for receiving the fill tube 22 also includes an opening 620, adjacent the intersection of the rear edge 56 and the upper edge 50 of the inflatable curtain 14, for receiving the fill tube 22 when the fill tube is inserted into the portion 600. The opening 620 is defined by a portion 622 of the perimeter connection 46 that extends along the upper edge 50 of the inflatable curtain 14 and intersects the rear edge 56 of the curtain. The opening is further defined by the edge 116 of the portion of the perimeter connection 46 that defines the curved rear-upper corner 68 of the inflatable volume 60.

The first and second round connections 110 and 114 are spaced apart from the upper edge 50 of the inflatable curtain 14 such that the first and second round connections help to guide the fill tube 22 into the inflatable curtain 14 when the tube is inserted into the curtain. The first and second round connections 110 and 114 also help to position the fill tube 22 relative to the inflatable curtain 14 and help to maintain the position of the fill tube relative to the curtain.

As illustrated in FIG. 2, the apparatus 10 may include first and second flexible elongated members, 640 and 660, respectively, such as tethers or ropes, that connect the inflatable curtain 14 to the vehicle side structure 16. As illustrated in FIG. 2a, the first flexible elongated member 640 connects the front edge 54 of the inflatable curtain 14 to the vehicle side structure 16. The first flexible elongated member 640 includes a first end 642 and an opposite second end 644. The first end 642 of the first flexible elongated member 640 is connected to the inflatable curtain 14 at a position near a front lower corner 646 of the curtain defined by the intersection of the front edge 54 and the bottom edge 52 of the curtain. The second end 644 of the first flexible elongated member 640 is connected to the vehicle side structure 16 at a first location 648 on the vehicle. The first location 648 may be located on or near an A pillar 710 of the vehicle 12.

Figure 2B:
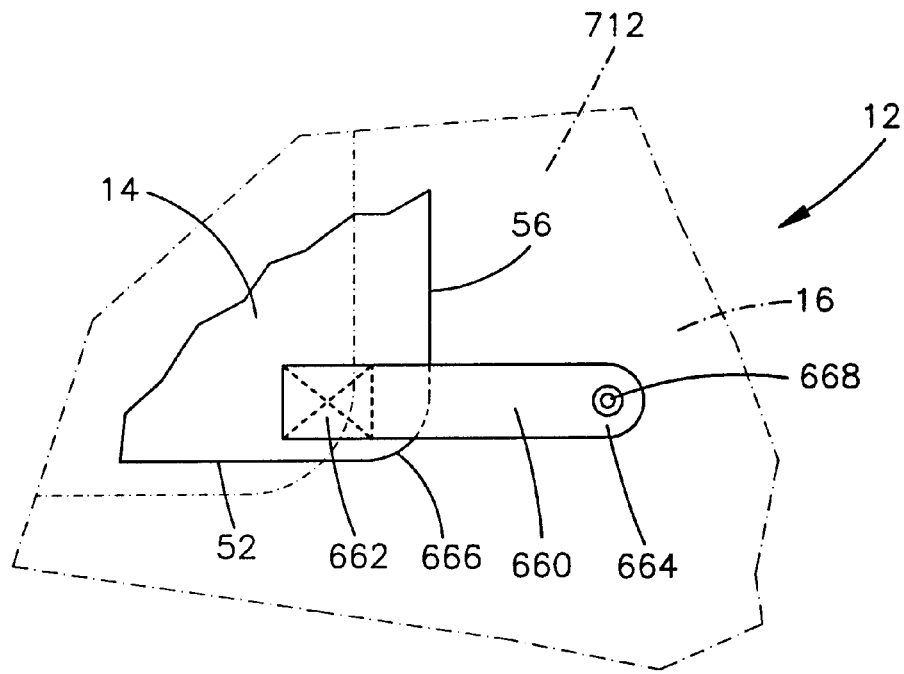

The second flexible elongated member 660 (FIG. 2) connects the rear edge 56 of the inflatable curtain 14 to the vehicle side structure 16. As illustrated in FIG. 2b, the second flexible elongated member 660 includes a first end 662 and an opposite second end 664. The first end 662 of the second flexible elongated member 660 is connected to the inflatable curtain 14 at a position near a rear lower corner 666 of the curtain defined by the intersection of the rear edge 56 and the bottom edge 52 of the curtain. The second end 664 of the second flexible elongated member 660 is connected to the vehicle side structure 16 at a second location 668 on the vehicle. The second location 668 may be located on or near a C pillar 712 of the vehicle 12.

The vehicle 12 includes a sensor mechanism 700 (shown schematically in FIGS. 1 and 2) for sensing a side impact to the vehicle 12 and/or a rollover of the vehicle 12. The sensor mechanism 700 actuates the inflator 24 in response to the sensing of a side impact or a vehicle rollover.

In the event of a rollover of the vehicle 12 or a side impact to the vehicle of a magnitude greater than a predetermined threshold value, the sensor mechanism 700 provides an electrical signal over lead wires 702 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 of the inflatable curtain 14 is positioned adjacent the intersection of the roof 18 and the side structure 16 of the vehicle 12. The front edge 54 of the inflatable curtain 14 is positioned adjacent the A pillar 710 of the vehicle 12. The rear edge 56 of the inflatable curtain 14 is positioned adjacent the C pillar 712 of the vehicle 12. The inflatable curtain 14 extends between the A pillar 710 and the C pillar 712 of the vehicle 12 and overlies at least a portion of the A pillar, C pillar, and a B pillar 714 of the vehicle. When the inflatable curtain 14 is inflated, the first and second flexible elongated members 640 and 660 help to maintain curtain positioned adjacent the side structure 16 of the vehicle.

It will be recognized by those skilled in the art that the inflatable curtain may have alternative configurations. For example, in the illustrated embodiment, the inflatable curtain 14 extends between the A pillar 710 and the C pillar 712 of the vehicle 12. The inflatable curtain 14 could, however, extend between the A pillar 710 and the B pillar 714 only or between the B pillar and the C pillar 712 only. Also, the inflatable curtain 14 could, when inflated, extend between the A pillar 710 and a D pillar 716 of the vehicle. In this instance, the inflatable curtain 14 would include a portion (not shown) similar to the front or rear portions 100 and 102 (FIG. 3) extending between the C pillar 712 and the D pillar 716 (FIG. 2).

The inflatable curtain 14, when inflated, helps to protect a vehicle occupant in the event of a vehicle rollover or a side impact to the vehicle 12. The points of connection 82 help to limit the thickness of the inflated inflatable curtain 14 and help to reduce the overall volume of the curtain. The drop-shaped end portions of the line connections 90 (FIG. 3) help to prevent the first and second panels 40 and 42 from becoming separated at the ends of the line connections upon inflation of the inflatable curtain 14 or during impacts with the curtain. The inflatable chambers 400, when inflated, help to absorb the energy of impacts with the inflatable curtain 14 and help to distribute the impact energy over a large area of the curtain.

When the inflatable curtain 14 is inflated, the lower chamber 450 helps to maintain the lower portion of the inflatable curtain 14 in the position and shape illustrated in FIG. 2. Also, the lower chamber 450 aids in maintaining the middle and upper portions of the inflatable curtain 14 in properly deployed positions adjacent the vehicle side structure 16. This helps to ensure that the inflatable curtain 14 will maintain a position and shape that helps to protect a vehicle occupant during a side impact and/or a vehicle rollover.

Figure 5:
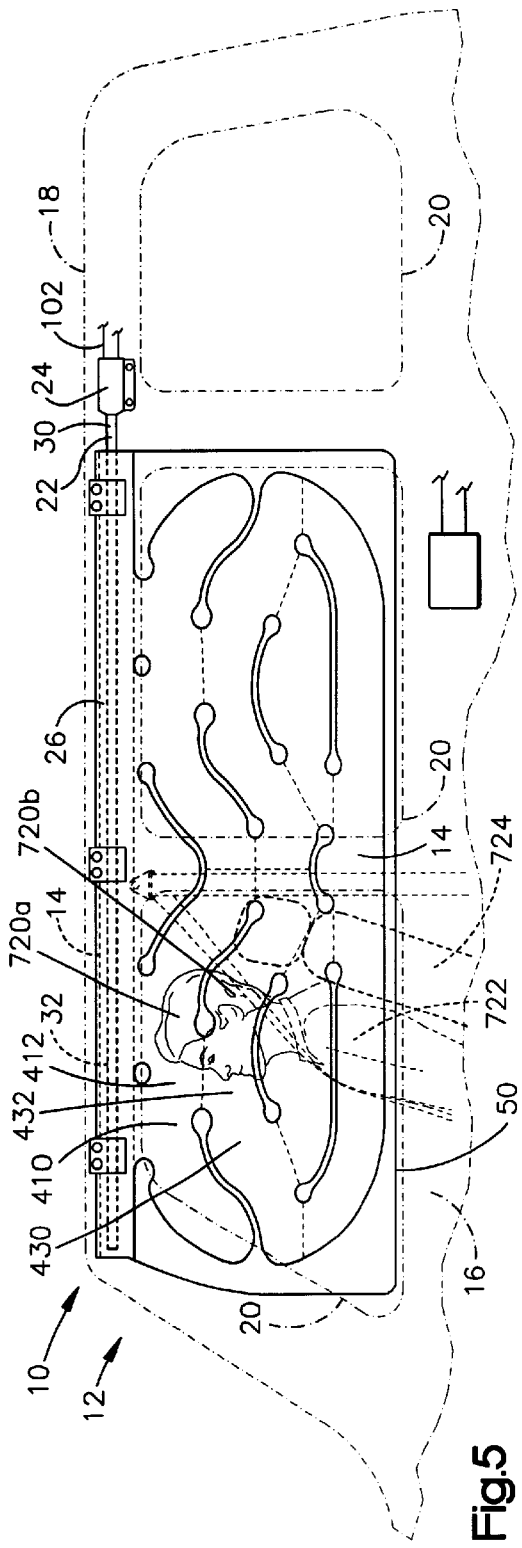
FIGS. 5–7 are schematic views of the apparatus of FIG. 2 depicting a vehicle occupant in different positions in the vehicle.
Figure 6:
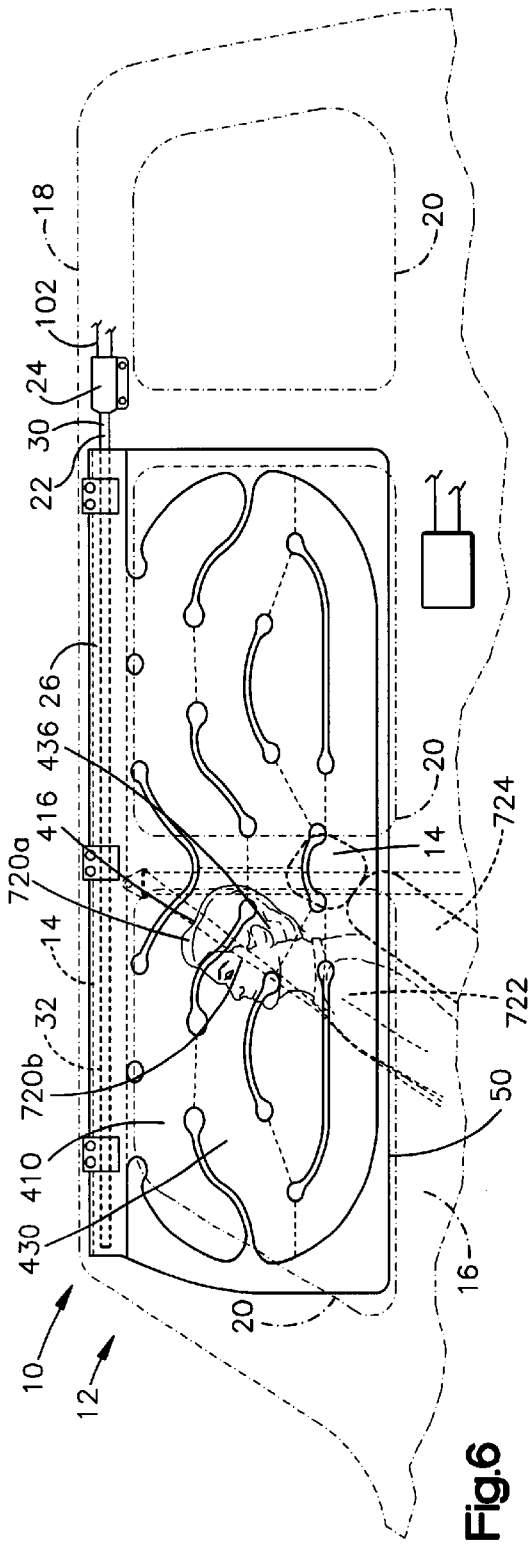
Figure 7:
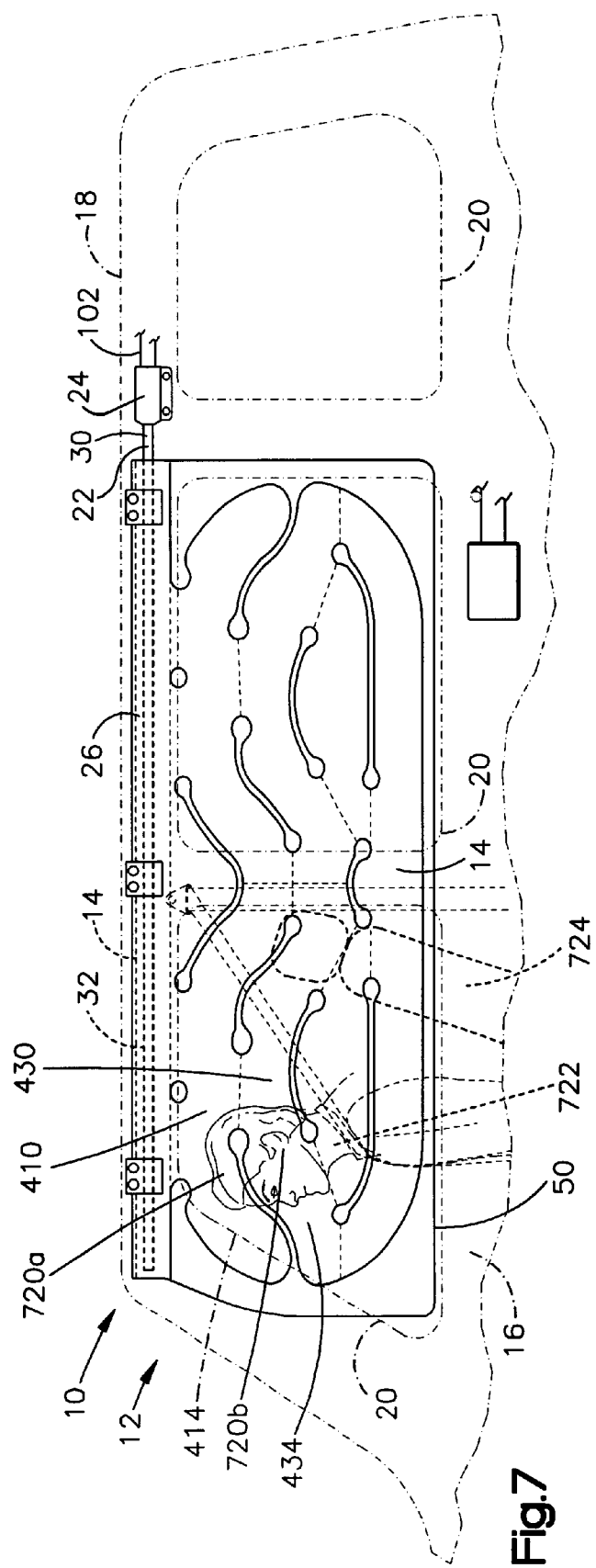

As illustrated in FIGS. 5–7, the first and second arc-shaped chambers 410 and 430 are positioned adjacent body parts 720a and 720b, respectively, of a vehicle occupant 722 in a front seat 724 of the vehicle. Depending on the size of the occupant 722, the body parts 720a and 720b positioned adjacent to the first and second arc-shaped chambers 410 and 430 may vary. The position of the first and second chambers 410 and 430 relative to the body parts 720a and 720b is maintained when the occupant is in the normal seated position of FIG. 5, the reclined position of FIG. 6, and in the leaned forward position of FIG. 7. As the occupant 722 moves between the reclined position and the leaned forward position, the body parts 720a and 720b move along an arc shaped path that coincides with the arc-shaped configuration of the first and second arc-shaped chambers 410 and 430. This helps to ensure that the first and second arc-shaped chambers 410 and 430 of the inflatable curtain 14 are positioned adjacent the body parts 720a and 720b when the occupant 722 of the vehicle 12 is at any position along the arc-shaped range of travel between the reclined or leaned forward position in the vehicle.

When the occupant is in the position of FIG. 5, the body part 720a is positioned adjacent the base portion 412 of the first arc-shaped chamber 410 and the body part 720b is positioned adjacent the base portion 432 of the second arc-shaped chamber 430. When the occupant is in the position of FIG. 6, the body part 720a is positioned adjacent the second leg portion 416 the first arc-shaped chamber 410 and the body part 720b is positioned adjacent the second leg portion 436 of the second arc-shaped chamber 430. When the occupant is in the position of FIG. 7, the body part 720a is positioned adjacent the first leg portion 414 the first arc-shaped chamber 410 and the body part 720b is positioned adjacent the first leg portion 434 of the second arc-shaped chamber 430.

The position of the third and fourth arc-shaped chambers 510 and 530 is such that body parts of a vehicle occupant in a rear seat of the vehicle (not shown) would be positioned adjacent the third and fourth arc-shaped chambers 510 and 530. The third and fourth arc-shaped chambers 510 and 530 would be positioned adjacent the body parts of the occupant when the occupant is at any position along the arc-shaped range of travel between a reclined position and a leaned forward position in the vehicle 12.

Figure 8:
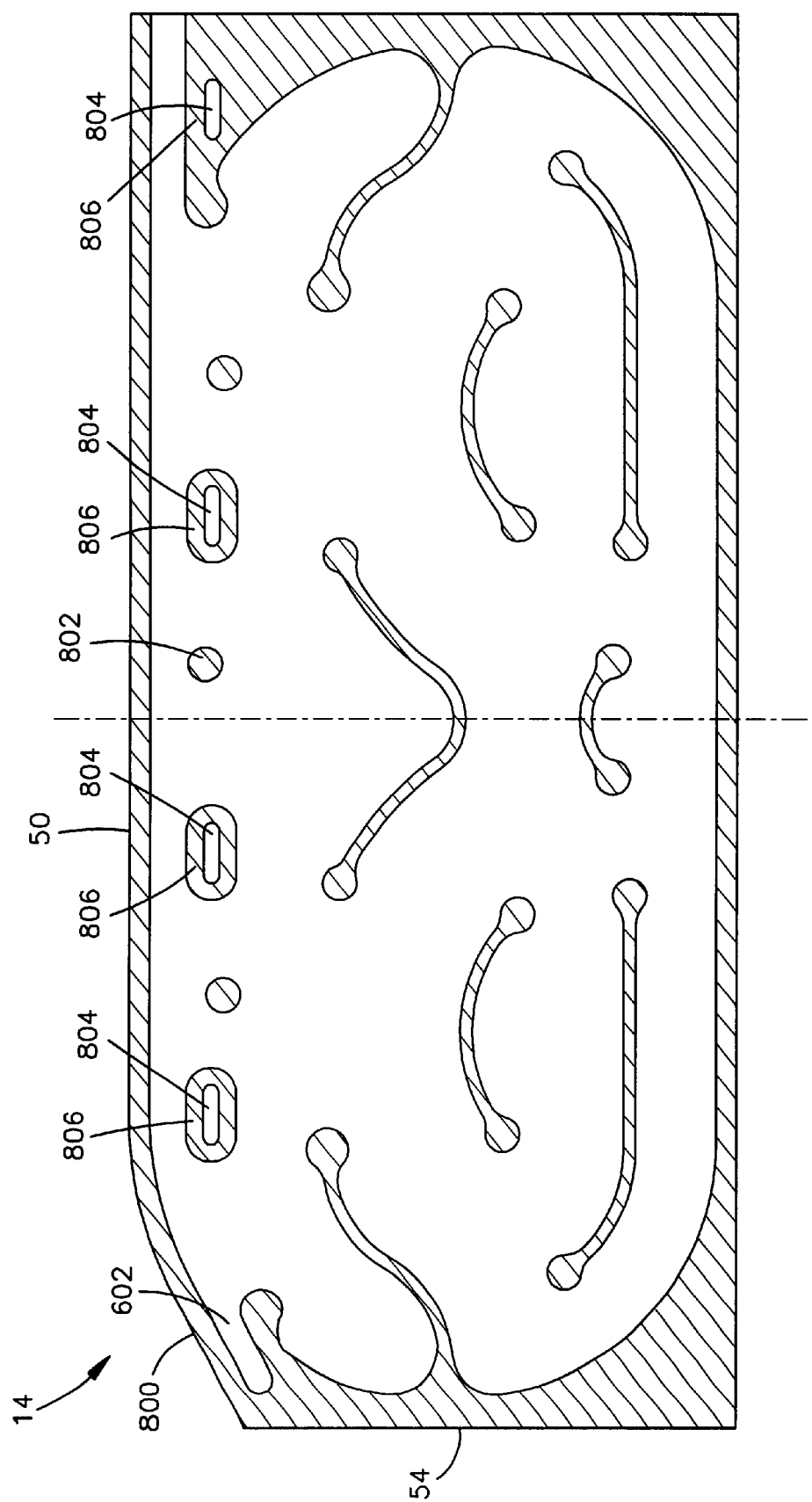
FIG. 8 is a schematic view illustrating an apparatus for helping to protect a vehicle occupant in a deflated condition, according to a second embodiment of the present invention.

Those skilled in the art will recognize that the inflatable curtain 14 may have varying configurations. For example, in a second embodiment of the invention illustrated in FIG. 8, the upper edge 50 of the inflatable curtain 14 may have a curved portion 800 adjacent the intersection of the upper edge 50 and the front edge 54 of the curtain. The pocket 602 thus may have a curved shape. Also, the inflatable curtain 14 may include a third round connection 802. The inflatable curtain may also include apertures 804 for allowing a fastening device (not shown), such as a clamp, to be inserted through the curtain. The apertures are surrounded by portions 806 where the first and second panels 40 and 42 of the inflatable curtain 14 that are interconnected, preferably by weaving the panels together. This helps to prevent leakage through the apertures 804 when the inflatable curtain 14 is inflated.

From the above description of the invention, those skilled in the art will perceive improvements, changes and modifications. For example, the perimeter connection 46, and thus the inflatable curtain 14, may have various outer shapes other than the generally rectangular shape illustrated in the Figures. The inflatable curtain 14 may also have various extents along the side structure of the vehicle. The various shapes and extents of the inflatable curtain 14 may result in the curtain including substantial uninflated portions. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device, when inflated, having a perimeter at least partially defined by upper and lower edges of said inflatable vehicle occupant protection device and front and rear edges spaced apart horizontally along said upper and lower edges; and an inflation fluid source that provides inflation fluid for inflating said inflatable vehicle occupant protection device;

said inflatable vehicle occupant protection device comprising overlying panels interconnected to form a perimeter connection extending along said perimeter and defining an inflatable volume bounded by said perimeter connection, and points of connection interconnecting said overlying panels within said inflatable volume and defining inflatable chambers of said inflatable vehicle occupant protection device, said chambers comprising:

first and second adjacent arc-shaped chambers each having a base portion and first and second leg portions that curve downwardly and outwardly away from opposite ends of said base portion, said first leg portions of said first and second arc-shaped chambers having a terminal end adjacent said front edge of said inflatable vehicle occupant protection device, said second leg portions of said first and second arc-shaped chambers having a terminal end spaced away from said front edge of said inflatable vehicle occupant protection device;

third and fourth adjacent arc-shaped chambers each having a base portion and first and second leg portions that curve downwardly and outwardly away from opposite ends of said base portion, said first leg portions of said third and fourth arc-shaped chambers having a terminal end adjacent said rear edge of said inflatable vehicle occupant protection device, said second leg portions of said third and fourth arc-shaped chambers having a terminal end spaced away from said rear edge of said inflatable vehicle occupant protection device, said terminal ends of said second leg portions of said first and third arc-shaped chambers being positioned adjacent each other, said terminal ends of said second leg portions of said second and fourth arc-shaped chambers being positioned adjacent each other, said first and third arc-shaped chambers extending adjacent to said upper edge of said inflatable vehicle occupant protection device; and a lower chamber that extends adjacent said lower edge of said inflatable vehicle occupant protection device, said lower chamber having a base portion and first and second leg portions that curve upwardly and outwardly away from opposite ends of said base portion of said lower chamber, said first leg portion of said lower chamber having a terminal end adjacent said front edge of said inflatable vehicle occupant protection device and said terminal end of said first leg portion of said second arc-shaped chamber, said second leg portion of said lower chamber having a terminal end adjacent said rear edge of said inflatable vehicle occupant protection device and said terminal end of said first leg portion of said fourth arc-shaped chamber, said points of connection being arranged such that a line extending vertically from said upper edge to said lower edge at any position within said inflatable volume intersects at least two of said chambers.

2. Apparatus as defined in claim 1, further including a fill tube having a portion located in said inflatable vehicle occupant protection device, said inflation fluid source being connected in fluid communication with a first end of said fill tube, said inflation fluid source, when actuated, providing inflation fluid to said fill tube, said fill tube directing said inflation fluid into said inflatable vehicle occupant protection device to inflate said inflatable vehicle occupant protection device, said inflatable vehicle occupant protection device including a pocket for receiving a second end portion of said fill tube, opposite said first end portion, said pocket surrounding said second end portion of said fill tube and forming a snug fit with said second end portion of said fill tube, said pocket helping to position said fill tube relative to said inflatable vehicle occupant protection device.

3. Apparatus as defined in claim 2, wherein said pocket is defined by portions of said overlying panels that are interconnected, said portions comprising:

a first portion defined by a portion of said perimeter connection extending along said upper edge and intersecting said front edge of said inflatable vehicle occupant protection device;

a second portion spaced apart from said first portion and extending generally parallel to said first portion and intersecting said front edge of said inflatable vehicle occupant protection device; and an end portion extending between said first and second portions, said end portion being defined by a portion of said perimeter connection extending along said front edge of said inflatable vehicle occupant protection device.

4. Apparatus as defined in claim 3, wherein at least a portion of said points of connection help to position said fill tube relative to said inflatable vehicle occupant protection device.

5. Apparatus as defined in claim 3, wherein said fill tube is positioned adjacent said upper edge of said inflatable vehicle occupant protection device.

6. Apparatus as defined in claim 1 further comprising a first flexible elongated member for connecting said front edge of said inflatable vehicle occupant protection device to the side structure of the vehicle, and a second flexible elongated member for connecting said rear edge of said inflatable vehicle occupant protection device to the side structure of the vehicle.

7. Apparatus as defined in claim 6, wherein said first flexible elongated member has a first end connected to a front lower corner of said inflatable vehicle occupant protection device and a second end connected to the vehicle side structure at a first location, said second flexible elongated member having a first end connected to a rear lower corner of said inflatable vehicle occupant protection device and a second end connected to the vehicle side structure at a second location.

8. Apparatus as defined in claim 7, wherein said first location is on an A pillar of the vehicle.

9. Apparatus as defined in claim 7, wherein said second location is on a C pillar of the vehicle.

10. Apparatus as defined in claim 1, wherein at least one of said arc-shaped chambers when inflated is adapted to extend along an arc-shaped path from a reclined position to a leaned forward position in the vehicle.

11. Apparatus as defined in claim 10, wherein said points of connection define first and second inflatable middle chambers, said first middle chamber being positioned between said second arc-shaped chamber and said lower chamber, said second middle chamber being positioned between said fourth arc-shaped chamber and said lower chamber.

12. Apparatus as defined in claim 1, wherein said points of connection define first and second inflatable middle chambers, said first middle chamber being positioned between said second arc-shaped chamber and said lower chamber, said second middle chamber being positioned between said fourth arc-shaped chamber and said lower chamber.

13. Apparatus as defined in claim 12, wherein said first, second, third, and fourth arc-shaped chambers, said lower chamber, and said first and second middle chambers are in fluid communication with each other.

14. Apparatus as defined in claim 1, wherein said points of connection comprise at least one of round connections and line connections, said line connections having opposite end portions, at least one of said end portions being drop-shaped, and a central portion extending between said end portions, said central portion including at least a portion that is curved.

15. Apparatus as defined in claim 14, wherein said round connections and said end portions of said line connections are circular.

16. Apparatus as defined in claim 1, wherein said inflatable vehicle occupant protection device when inflated extends along the side structure of the vehicle between an A pillar and a C pillar of the vehicle.

17. Apparatus as defined in claim 1, wherein said inflatable vehicle occupant protection device, when inflated, overlies at least a portion of an A pillar, a B pillar and a C pillar of the vehicle.

18. Apparatus as defined in claim 1, wherein said inflatable vehicle occupant protection device is an inflatable curtain having a stored position extending along the side structure adjacent a roof of the vehicle, said inflatable curtain being inflated away from the vehicle roof into said position between the side structure of the vehicle and a vehicle occupant.

19. Apparatus as defined in claim 1, wherein said overlying panels are woven together to form said points of connection.

20. Apparatus as defined in claim 1, wherein said points of connection comprise stitching securing said panels together.

21. Apparatus as defined in claim 1, wherein at least one of said points of connection is adapted to receive means for helping to connect said inflatable vehicle occupant protection device to the vehicle.

22. Apparatus as defined in claim 1, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

23. Apparatus as defined in claim 1, wherein said inflation fluid source comprises an inflator that is actuatable to inflate said inflatable vehicle occupant protection device.

24. Apparatus as defined claim 1, wherein said first leg portions of said first and second arc-shaped chambers are positioned adjacent an A pillar of the vehicle.

25. Apparatus as defined in claim 1, wherein said first leg portions of said third and fourth arc-shaped chambers are positioned adjacent a C pillar of the vehicle.

26. Apparatus as defined in claim 1, wherein said second leg portions of said first, second, third and fourth arc-shaped chambers are positioned adjacent a B pillar of the vehicle.

* * * * *